United States Patent
Chang

(10) Patent No.: US 8,115,735 B2
(45) Date of Patent: Feb. 14, 2012

(54) MOUSE WITH ADJUSTABLE CABLE DIRECTION

(76) Inventor: Yuan-Jung Chang, Hsinchuang (TW)

( * ) Notice: Subject to any disclaimer, the term of this patent is extended or adjusted under 35 U.S.C. 154(b) by 815 days.

(21) Appl. No.: 12/219,874

(22) Filed: Jul. 30, 2008

(65) Prior Publication Data

US 2009/0091534 A1    Apr. 9, 2009

(30) Foreign Application Priority Data

Oct. 3, 2007 (TW) .............................. 96216507 U

(51) Int. Cl.
*G06G 5/08*    (2006.01)
(52) U.S. Cl. ........................................ 345/163; 345/165
(58) Field of Classification Search ........... 345/156–168
See application file for complete search history.

(56) References Cited

U.S. PATENT DOCUMENTS

| 7,358,957 | B2 * | 4/2008 | Zhang | 345/163 |
| 7,911,449 | B2 * | 3/2011 | Chang | 345/163 |
| 2006/0023402 | A1 * | 2/2006 | Chin | 361/600 |

FOREIGN PATENT DOCUMENTS

TW    M291570    6/2006

* cited by examiner

*Primary Examiner* — Vijay Shankar
(74) *Attorney, Agent, or Firm* — Rosenberg, Klein & Lee

(57) ABSTRACT

A mouse with adjustable cable direction includes a main body and a cable. The main body has a plurality of positioning grooves formed in a front end portion of a bottom thereof, and each positioning groove extends to an outer edge of the main body. One end of the cable extends into the main body and the cable can be received in the corresponding grooves in the bottom of the main body. Accordingly, the present invention can improve configuration flexibility of the bottom thereof and is convenient for use, and the cable cannot be in the way of other objects and has a good controllability, which is convenient for use.

4 Claims, 3 Drawing Sheets

MOUSE WITH ADJUSTABLE CABLE DIRECTION

BACKGROUND OF THE INVENTION

1. Field of the Invention

The present invention relates to a mouse, and more especially to a mouse with adjustable cable direction.

2. Description of Related Art

With the development of information science and technology, various computers, such as desktop computers, notebook computers and so on, are commonly used. For more convenient computer operation, mice and keyboards are mainly used to control the operation of computers.

Mice are important devices for operating computers. There are two kinds of mice: mechanical mice and optical mice. At present, most users choose and use optical mice. The working principle of an optical mouse is that a light source (such as LED etc.) mounted in the optical mouse emits light, and a photosensitive device receives the reflected light from the light source, converts the optical signals and then transmits them into a host computer to move a cursor on a display screen.

Conventional mice, whether mechanical mice or optical mice, have cables for transmitting signals disposed on front ends of main bodies thereof via fixed connection. However, in practical use, since the direction of the fixed cable cannot be adjusted according to different user requirements, the mice cannot meet user operation habits (such as left-handed operation or right-handed operation), which is inconvenient for use; furthermore, the cables of the mice are easy to be in the way of other objects so that the mice has a poor controllability and is inconvenient for use.

Accordingly, for improving the shortcomings described above, Taiwan Patent No. M291570 (Application No. 94222234), which is a related patent filed by the inventors of the present invention, discloses a mouse which includes a main body, a cable extending into the main body and a rotating plate pivotingly disposed on a bottom of the main body. The cable passes through the rotating plate and is positioned on the rotating plate. Basing on the design of the rotating plate, the use direction of the cable can be adjusted.

However, the patent described above still has some disadvantages. The rotating plate occupies the most space of the bottom of the mouse, so the space practicality of the bottom of the mouse is limited and the space of the bottom of the mouse cannot be made full use of, so that the patent has no configuration flexibility of disposing other components in the bottom of the mouse, which is inconvenient for use.

Hence, the inventors of the present invention believe that the shortcomings described above are able to be improved and finally suggest the present invention which is of a reasonable design and is an effective improvement.

SUMMARY OF THE INVENTION

An object of the present invention is to provide a mouse with adjustable cable direction which can improve configuration flexibility of the bottom thereof, wherein the mouse is convenient for use, and the cable of the mouse cannot be in the way of other objects and has a good controllability, which is convenient for use.

To achieve the above-mentioned object, a mouse with adjustable cable direction in accordance with the present invention is provided. The mouse with adjustable cable direction includes: a main body which has a plurality of positioning grooves formed in a front end portion of its bottom, wherein each positioning groove extends to an outer edge of the main body; and a cable one end of which extends into the main body, wherein the cable is received in the corresponding grooves in the bottom of the main body.

The efficacy of the present invention is as follows: the present invention has the positioning grooves formed in the front end portion of the bottom of the main body of the mouse, and the cable directly extends into the main body, so the bottom of the mouse has a good space practicality and other components can be disposed in the bottom for improving configuration flexibility of the mouse; additionally, the cable can be adjusted to the front end, the left side or the right side of the front end portion of the mouse, so the mouse is convenient for use, and the cable cannot be in the way of other objects and has a good controllability, which is convenient for use.

To further understand features and technical contents of the present invention, please refer to the following detailed description and drawings related the present invention. However, the drawings are only to be used as references and explanations, not to limit the present invention.

DETAILED DESCRIPTION OF THE PREFERRED EMBODIMENTS

Figure 1:
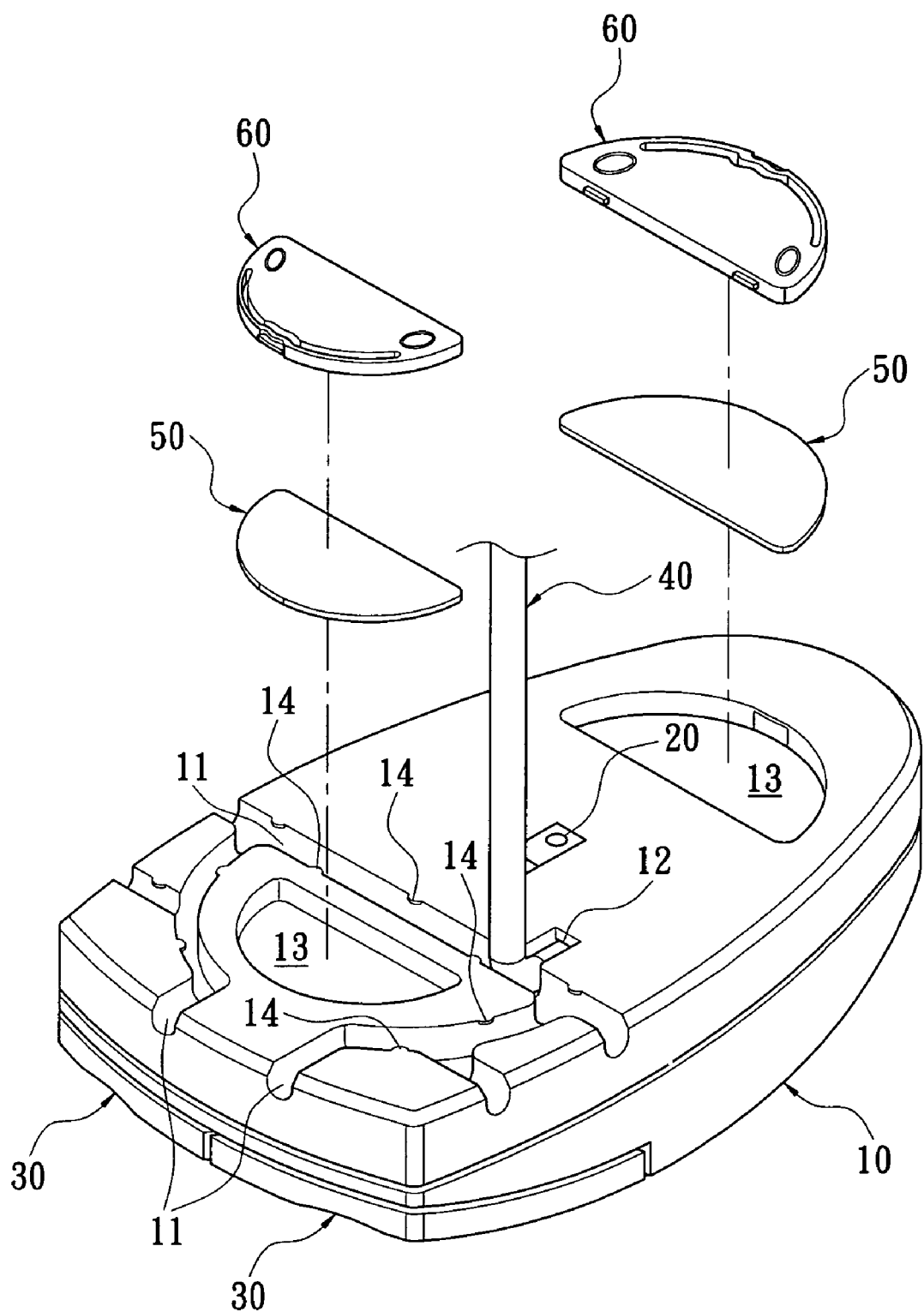
FIG. 1 is a perspective view of the present invention.
Figure 2:
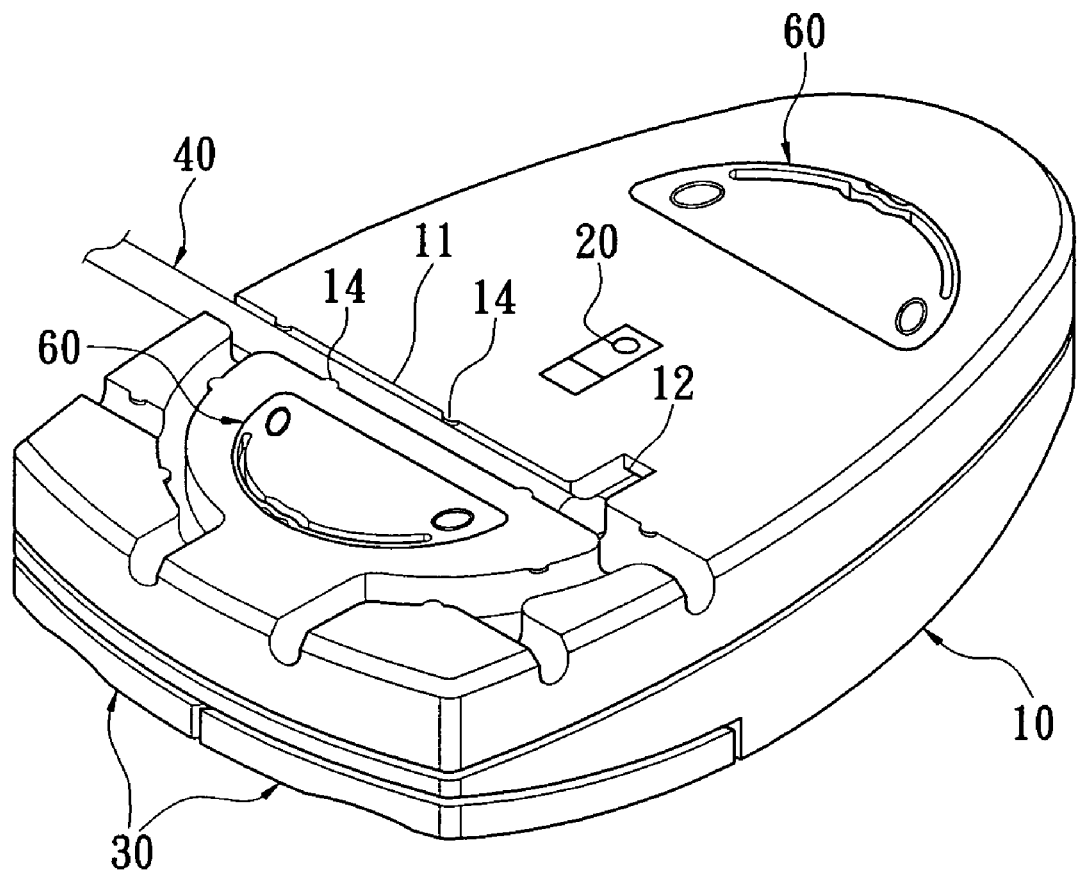
FIG. 2 is an assembled perspective view of the present invention.

Please refer to FIG. 1 and FIG. 2, a mouse with adjustable cable direction in accordance with the present invention includes a main body 10, a cursor control unit 20, a plurality of press buttons 30 and a cable 40. Further, the mouse may include at least two stabilizing weights 50.

The main body 10 is a hollow shell which is made of plastic material and has a circuit board (not shown) disposed thereinside. A plurality of positioning grooves 11 is formed in the bottom of the main body 10. The number of positioning grooves 11 may vary based on requirements. Each positioning groove 11 is formed in a front end portion of the bottom of the main body 10 and extended to an outer edge of the main body 10. A cable hole 12 is formed in the center of the bottom of the main body 10 and connected with the corresponding positioning grooves 11.

The cursor control unit 20 may be a mechanical or optical control unit. Preferably, the cursor control unit 20 is an optical control unit which can save the available space of the bottom of the main body 10. The cursor control unit 20 is disposed inside the main body 10 and electrically connected with the circuit board described above. The cursor control unit 20 is exposed on the bottom of the main body 10 for controlling moving direction and distance of a cursor of the mouse.

Each press button 30 is disposed on a front end portion of a top of the main body 10 and electrically connected with the circuit board properly. Pressing each press button 30 can perform functions of performing menu instructions, selecting characters or patterns, pressing buttons or options in dialog boxes, displaying context menus, etc. Besides, the main body 10 may further has a wheel (not shown) disposed thereon, which may be rolled to drive windows on display screens.

One end of the cable 40 passes through the cable hole 12 and extends into the main body 10, and is electrically connected with the circuit board in the main body 10. The other end of the cable 40 is connected with a connector (not shown) so as to be inserted in a host computer, thereby signals can be transmitted between the mouse and the host computer via the cable 40. Since the general structure of the mouse described above is well known to those skilled in the art and is not within the scope of the present invention, it is omitted in the present invention.

The mouse has receiving cavities 13 formed in the front end portion and the rear end portion of the bottom of the main body 10, and two cover bodies 60 respectively covering the corresponding receiving cavities 13 in the bottom of the main body 10. The receiving cavity 13 located in the front end portion of the bottom of the main body 10 is formed between the positioning grooves 11. Additionally, each positioning groove 11 may have fastening portions 14 protruding from its inner walls.

The stabilizing weights 50 may be made of heavy materials, such as metals, and cylinder-shaped or sheet-shaped. The number of the stabilizing weights 50 is preferably two, but not limited thereto. The two stabilizing weights 50 are disposed in the two receiving cavities 13 in the bottom of the main body 10, correspondingly and respectively, and the covering bodies 60 cover the receiving cavities 13 of the main body 10, thereby fixing each stabilizing weight 50. The present invention respectively disposes the stabilizing weights 50 in the opposite front and rear end portions of the bottom of the main body 10, so that the mouse can stand more stable due to gravity during operation, thereby users can operate the mouse with facility.

Figure 3:
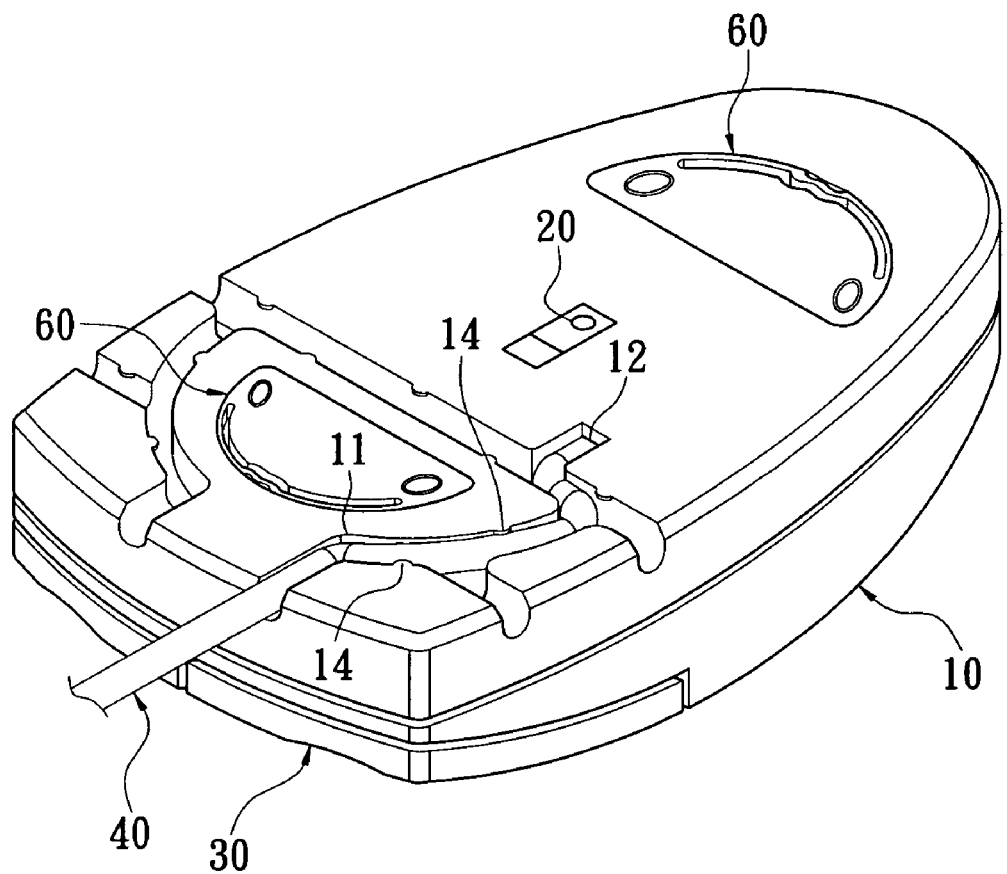
FIG. 3 is another assembled perspective view of the present invention.

The present invention can adjust the outlet direction of the cable 40 according to the direction of each positioning groove 11. The cable 40 is received in the corresponding grooves 11 and may be adjusted in different outlet directions so as to extend outwards from the front end, the left side or the right side of the front end portion of the mouse (as shown in FIG. 2 and FIG. 3), thereby meeting user operation habits and requirements. At the same time, the cable 40 may be fastened by the fastening portions 14 in the positioning grooves 11 so that the cable 40 is fixed after direction adjustment.

Consequently, the present invention has positioning grooves 11 formed in the front end portion of the bottom of the main body 10 of the mouse, and the cable 40 directly extends into the main body 10, so the bottom of the mouse has a good space practicality and other components (for example, the stabilizing weights 50 in the present invention) can be disposed in the bottom for improving configuration flexibility of the mouse. Additionally, the cable 40 can be adjusted to the front end, the left side or the right side of the front end portion of the mouse, so the mouse is convenient for use, and the cable cannot be in the way of other objects and has a good controllability, which is convenient for use.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A mouse with adjustable cable direction, comprising:
a main body, having a bottom with a front portion and a rear portion and a plurality of positioning grooves formed on the front portion of the bottom, each positioning groove extending to an outer edge of the main body, wherein the main body has a cable hole formed through the bottom of the main body and connected with the corresponding positioning grooves;
a first receiving cavity arranged at the front portion of the bottom of the main body for receiving a removable stabilizing weight, wherein at least one of the positioning grooves is arranged substantially around a periphery of the first receiving cavity, wherein the cable hole is located outside the first receiving cavity; and
a cable, having one end extended from the cable hole of the main body, the cable being lodged in the corresponding grooves in the bottom of the main body.

2. The mouse with adjustable cable direction as claimed in claim 1, wherein each positioning groove has fastening portions protruding from inner walls thereof for fastening the cable.

3. The mouse with adjustable cable direction as claimed in claim 1, further comprising a second receiving cavity arranged at the rear bottom portion of the main body, wherein the cable hole is located between the two stabilizing weights.

4. The mouse with adjustable cable direction as claimed in claim 3, further comprising cover bodies respectively covering the corresponding receiving cavities in the bottom of the main body.

* * * * *